April 15, 1941. L. H. PEEPLES 2,238,657
REEL
Filed Aug. 3, 1940 2 Sheets-Sheet 2

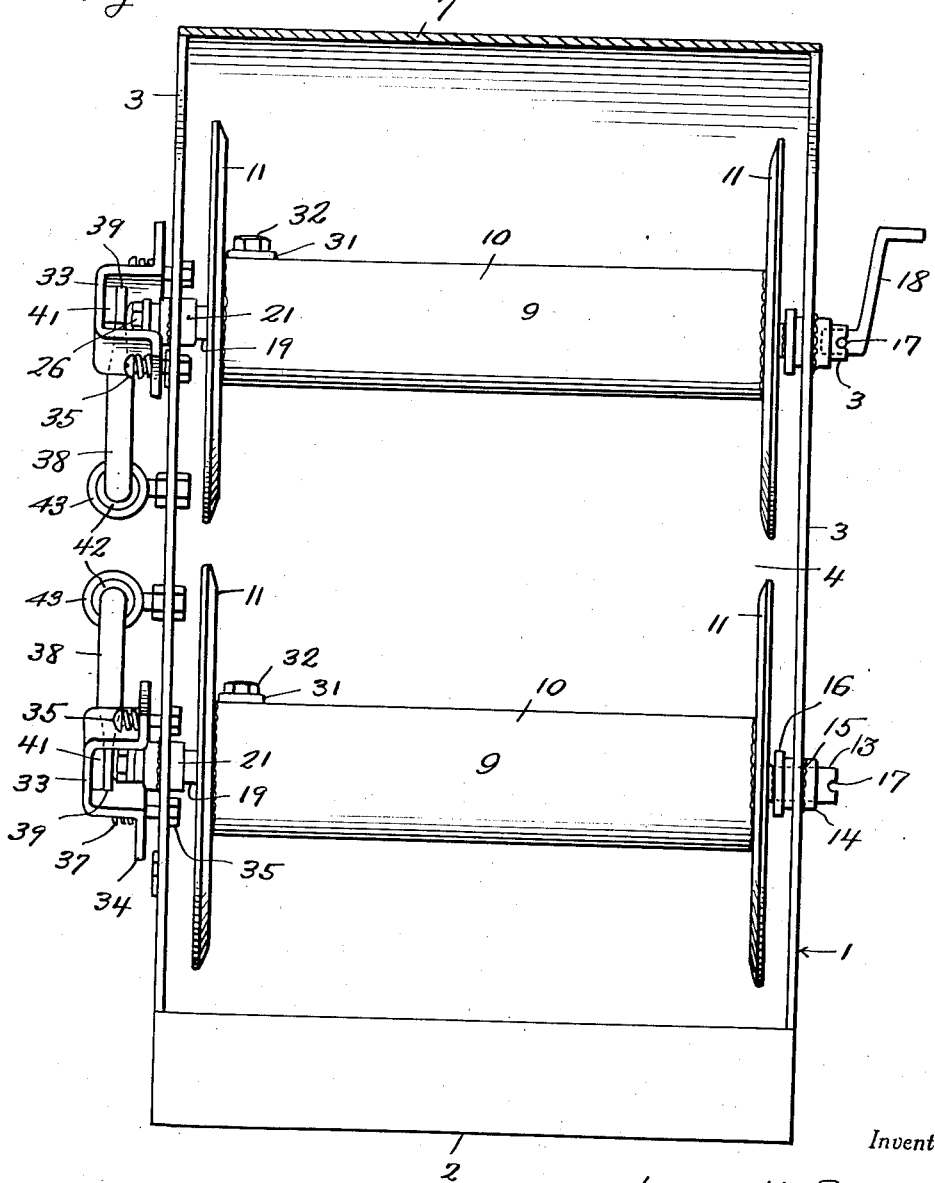

Inventor
Louis H. Peeples

By Clarence A. O'Brien

Attorneys

Patented Apr. 15, 1941

2,238,657

UNITED STATES PATENT OFFICE 2,238,657

REEL

Louis H. Peeples, Kamay, Tex.

Application August 3, 1940, Serial No. 350,817

3 Claims. (Cl. 191—12.2)

My invention relates to improvements in winding and reeling apparatus and more particularly to reels for the electric cables of welding machines.

The principal object of the invention is to provide a simply constructed reel apparatus for quickly winding, or unwinding, a pair of electric welding cables while maintaining positive connections between said cables and the electric welding machine at all times.

To the accomplishment of the above, and subordinate objects presently appearing, a preferred embodiment of my invention has been illustrated in the accompanying drawings, set forth in detail in the succeeding description, and defined in the claims appended hereto.

Figure 3:
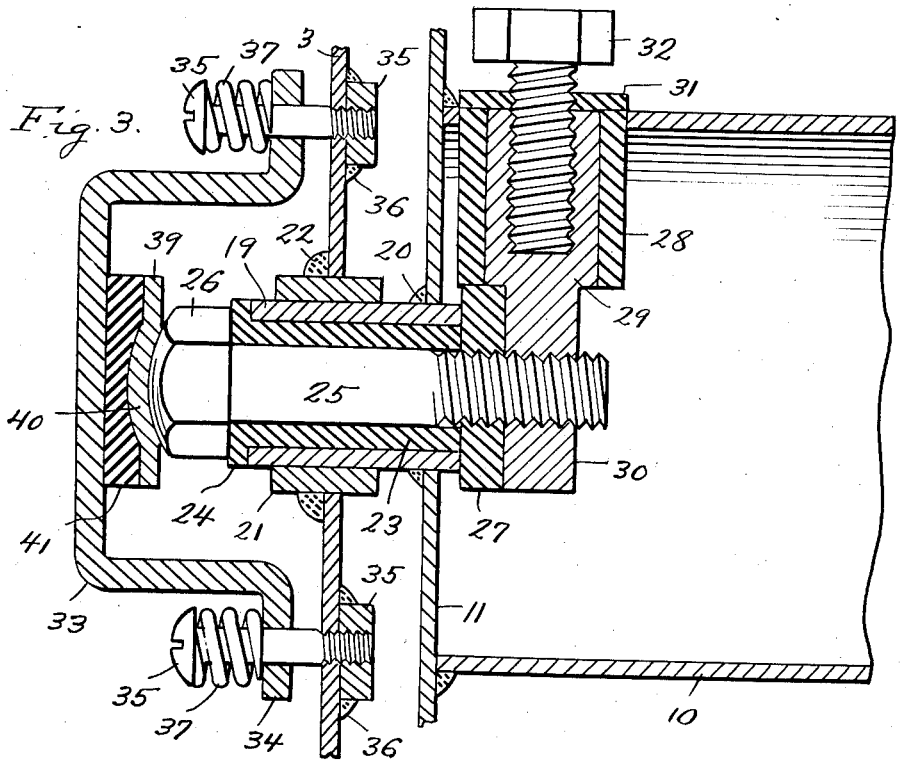
Figure 2:
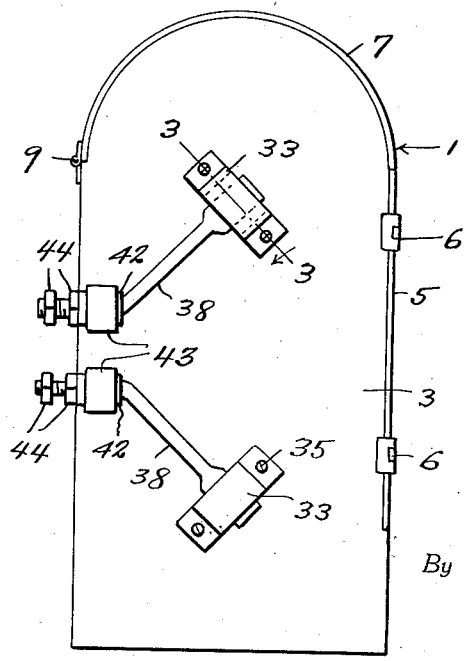

In said drawings:

Figure 1 is a view in vertical section of the preferred embodiment of my invention, Figure 2 is a view in side elevation drawn to a reduced scale, and Figure 3 is a fragmentary view in transverse section taken on the line 3—3 of Figure 2.

Referring to the drawings by numerals, the illustrated embodiment of my invention comprises a box-like housing 1 of suitable metal and generally rectangular form including a bottom 2, sides 3 having upper rounded ends, a back 4, a front door 5 suitably hinged, as at 6, to one side 3, and a curved top 7 hinged to the back 4 as at 8.

The housing 1 contains a pair of upper and lower spools each comprising a cylinder 10 forming the body of the spool and a pair of annular end disks 11 forming the flanges thereof, said disks 11 being welded to the ends of the cylinder, as at 12, and having axial bores. The spools 9 extend endwise between the sides 3 of the housing 1 and are mounted at their ends for rotation about horizontal parallel axes. For this purpose, the end disks 11 at one side of the housing 1 are provided with trunnions 13 extending through bearings 14 in said side 3 and welded thereto, as at 15, the trunnions being provided with end thrust collars 16 thereon and adapted, in any suitable manner, for instance, as indicated at 17, to receive a crank 18 for rotating the same.

The disks 11 on the ends of the spools 9 at the other side 3 of the housing are provided with axial cylindrical trunnions 19 fitting in the bores thereof and to which said disks are welded, as at 20, said trunnions being made of suitable metal and extending slightly at their inner ends into the cylinders 10 for a purpose presently seen. The trunnions 19 are journalled in suitable ring type bearings 21 set into said other side 3 of the housing 1 and welded thereto as at 22. Bushings 23 of insulation are fitted into the trunnions 19 with outer end flanges 24 bearing against the outer ends of the trunnions.

Bolts 25 extend into and through the bushings 23 with the heads 26 thereof bearing against the outer ends of the same, and their inner ends threaded and projecting part way into the cylinders 10. Disk type nuts 27 of insulation turned onto the inner ends of the bolts 25 against the inner ends of the bushings 23 and trunnions 19 clamp the bolts in the bushings and the latter to the trunnions 23 so that said bushings 19 and bolts 25, together with nuts 27, rotate with the trunnions 19. The bolts 25, as will presently clearly appear, form rotary conductor members. The cylinders 10 are provided with radial, internal sleeves 28 of insulation suitably secured at their outer ends in the cylinders adjacent the inner ends of bolts 25.

Bronze conductor posts 29 are fitted in the sleeves 28 with reduced, apertured ends 30 threaded onto the inner ends of said bolts 25 against the nuts 27. The outer ends of the sleeves 28 are capped by insulation disks 31. Binding posts 32 having the form of bolts extend through the disks 31 into the conductor posts 29.

The heads 26 of bolts 25 are convex and adapted to rotate in a pair of U-type yokes 33 of strap iron having out-turned apertured ends 34. Screw bolts 35 extend through said ends 34 and through said side 3 into nuts 35 welded, as at 36, to the inner face of said side. Coil springs 37 interposed between the heads of bolts 35 and ends 34 of yokes 33 tension said yokes against outward movement.

A pair of bronze conductor rods 38 are provided on the side 3 of housing 1 equipped with the yokes 33, said rods having flat inner ends 39 with concave sockets 40 formed therein, said ends being interposed between the heads 26 of the bolts 25 and concave insulation blocks 41 suitably secured to the inner faces of said yokes, the arrangement being such that the sockets 40 seat the heads 26 so that the latter may rotate therein, the blocks 41 seat the ends 39 of said rods and the yokes 33 yieldingly clamp the ends 39 of rods 38 against said heads 26. The outer ends of the conductor rods 38 are rotatably mounted in insulation bushings 42 fitted in bearings 43 suitably mounted on the adjacent side 3 of housing 1, said ends of the rods 38 being equipped with a pair of clamping nuts 44 for the attachment to said rods of leads, not shown, from an electric welding machine.

The operation of the described invention will be readily understood. The pair of electric welding cables, not shown, to be wound, or unwound, are secured to the binding posts 32 for winding or unwinding of the cables on the cylinders 10 of the described spools. During rotation of said spools contact is positively maintained with the conductor rods 38, and hence the welding machine, through the posts 30 and bolts 25, and the socketed inner ends 39 of said rods, the heads 26 of bolts 25 rotating in the sockets 40 of the inner ends of the rods.

The foregoing will, it is believed, suffice to impart a clear understanding of my invention without further explanation.

Manifestly the invention, as described, is susceptible of modification without departing from the inventive concept, and right is herein reserved to such modifications as fall within the scope of the subjoined claims.

What I claim is—

1. In a reel a housing, a spool in said housing comprising a cylinder closed at one end, a cylindrical trunnion extending from said end of the cylinder and journalled in said one wall of the housing, a conductor bolt journalled in said trunnion and insulated therefrom, said bolt having an inner end extending into said cylinder and an outer head end extending outwardly from said trunnion, a radial sleeve of insulation in said cylinder fixed in the circumferential part thereof, a conductor post fixed in said sleeve and having an inner end threaded onto the inner end of said bolt-like conductor, whereby said bolt is rotated by said cylinder, means on the outer end of said post for attaching an electric cable thereto to be wound on said cylinder, and means on said wall for maintaining an electrical connection between an electrical lead cable and the head of the bolt during rotation of the latter.

2. In a reel a housing having a side wall, a spool in said housing comprising a cylinder closed at one end, a cylindrical trunnion extending from said end of the cylinder and journalled in said side wall, a conductor bolt journalled in said trunnion and insulated therefrom, said bolt having an inner end extending into said cylinder and an outer head end extending outwardly from said trunnion, a radial sleeve of insulation in said cylinder fixed in the circumferential part thereof, a conductor post fixed in said sleeve and having an inner end threaded onto the inner end of said bolt-like conductor, whereby said bolt is rotated by said cylinder, a binding post threaded into the outer end of said post for the attachment of an electric cable thereto to be wound on said cylinder, and means on said side wall for maintaining an electrical connection between an electrical lead cable and the head of the bolt during rotation of the latter, said means comprising a conductor rod pivotally mounted on said wall and having a flat concave end forming a socket for the head of the bolt, and means yieldingly urging said end against said head.

3. In a reel a housing having a side wall, a spool in said housing comprising a cylinder closed at one end, a cylindrical trunnion extending from said end of the cylinder and journalled in said side wall, a conductor bolt journalled in said trunnion and insulated therefrom, said bolt having an inner end extending into said cylinder and an outer head end extending outwardly from said trunnion, a radial sleeve of insulation in said cylinder fixed in the circumferential part thereof, a conductor post fixed in said sleeve and having an inner end threaded onto the inner end of said bolt-like conductor, whereby said bolt is rotated by said cylinder, a binding post threaded into the outer end of said post for the attachment of an electric cable thereto to be wound on said cylinder, and means on said side wall for maintaining an electrical connection between an electrical lead cable and the head of the bolt during rotation of the latter, said means comprising a conductor rod pivotally mounted on said wall and having a flat concave end forming a socket for the head of the bolt, and means yieldingly urging said end against said head, said last means comprising a spring pressed yoke straddling said head, and an insulation block interposed between said yoke and the concave end of the rod.

LOUIS H. PEEPLES.